United States Patent
Harms, Jr. et al.

(10) Patent No.: US 11,244,277 B1
(45) Date of Patent: Feb. 8, 2022

(54) GEOGRAPHICALLY DISTRIBUTED SMART ADDRESS SIGNS FOR END-TO-END DELIVERY CONFIRMATION SYSTEM OVER A DATA COMMUNICATION SYSTEM

(71) Applicants: Frank Harms, Jr., San Jose, CA (US); Frank Harms, III, San Jose, CA (US); Cuauhtemoc Val Alvarez, Salinas, CA (US); Mark Joseph Mendiola Tarmann, Jr., Hammonton, NJ (US)

(72) Inventors: Frank Harms, Jr., San Jose, CA (US); Frank Harms, III, San Jose, CA (US); Cuauhtemoc Val Alvarez, Salinas, CA (US); Mark Joseph Mendiola Tarmann, Jr., Hammonton, NJ (US)

( * ) Notice: Subject to any disclaimer, the term of this patent is extended or adjusted under 35 U.S.C. 154(b) by 0 days.

(21) Appl. No.: 17/175,157

(22) Filed: Feb. 12, 2021

(51) Int. Cl.
*G06F 16/29* (2019.01)
*G06Q 10/08* (2012.01)

(52) U.S. Cl.
CPC ......... *G06Q 10/0833* (2013.01); *G06F 16/29* (2019.01)

(58) Field of Classification Search
CPC .... G06Q 10/0833; G06Q 10/02; G06Q 20/18; G06Q 20/308; G06Q 20/321; G06Q 50/14; G06Q 20/12; G06Q 20/3255; G06Q 20/385; G06Q 20/4012; G06Q 20/425; G06Q 30/0635; G06F 16/29; G06F 16/90332; G06F 16/00; G06F 16/90; G06F 16/903; G06F 16/9032; G06F 16/9536; G10L 15/26; H04L 51/04; H04L 51/18

See application file for complete search history.

(56) References Cited

U.S. PATENT DOCUMENTS

| | | | | |
|---|---|---|---|---|
| 2016/0012465 A1* | 1/2016 | Sharp | .................. | G06Q 20/386 705/14.17 |
| 2017/0270803 A1* | 9/2017 | High | ..................... | G05D 1/0202 |
| 2018/0330322 A1* | 11/2018 | Danyluk | ............ | G06Q 10/0832 |
| 2019/0019144 A1* | 1/2019 | Gillen | .................. | H04L 9/3242 |
| 2020/0017237 A1* | 1/2020 | Walker | ................ | G01G 19/002 |
| 2020/0219348 A1* | 7/2020 | Hanlon | .................... | G07C 9/21 |
| 2020/0410440 A1* | 12/2020 | Hickey | .................. | G06F 16/29 |

* cited by examiner

*Primary Examiner* — Hai Phan
*Assistant Examiner* — Anthony D Afrifa-Kyei
(74) *Attorney, Agent, or Firm* — Law Office of Dorian Cartwright; Dorian Cartwright

(57) ABSTRACT

An address sign registration module receives and stores geo-locations and unique identifiers from a plurality of smart address signs wirelessly connected to the data communication network. Each address sign displays a physical address associated with a geo-location and comprises wireless transceiver. The order tracking module receives messages from the smart address signs upon arrival of orders associated with the geo-locations and, in response, predicts deliveries and fraud with artificial intelligence and sends messages to online purchase systems confirming delivery.

10 Claims, 5 Drawing Sheets

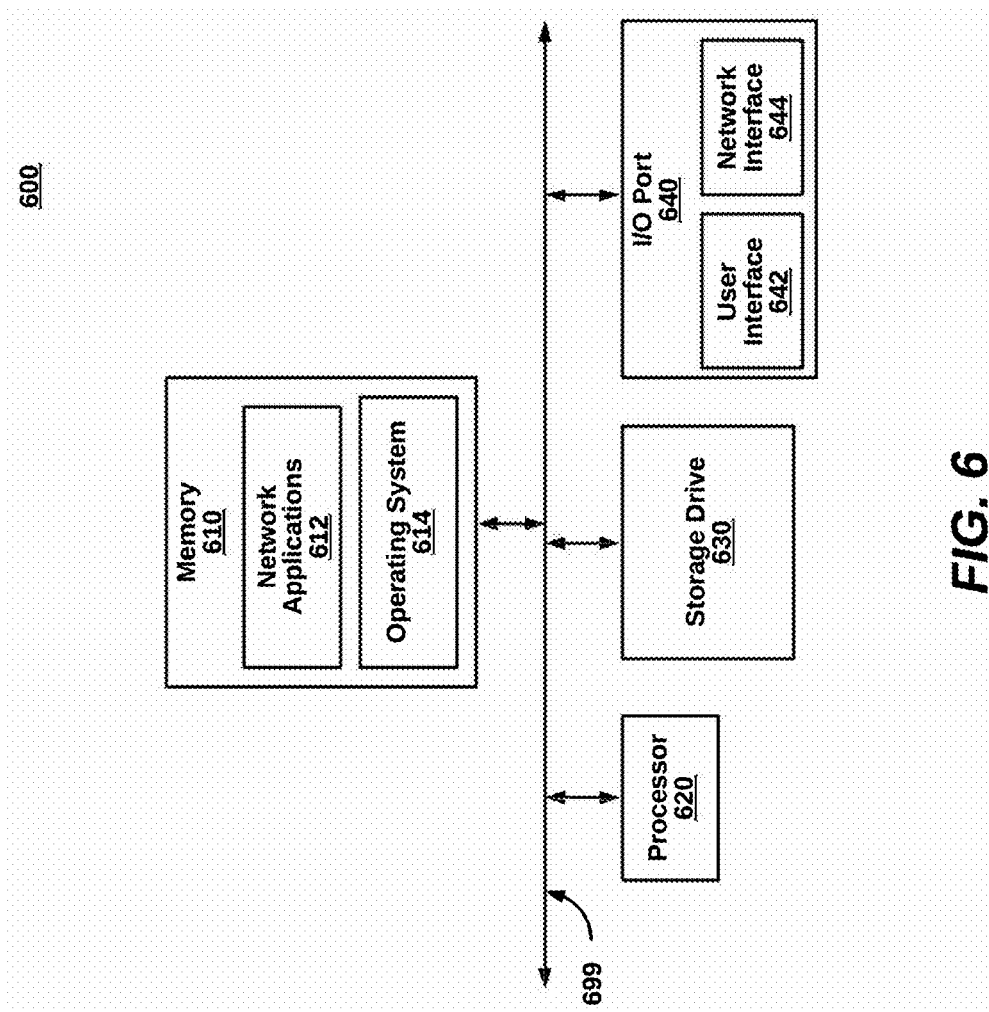

GEOGRAPHICALLY DISTRIBUTED SMART ADDRESS SIGNS FOR END-TO-END DELIVERY CONFIRMATION SYSTEM OVER A DATA COMMUNICATION SYSTEM

FIELD OF THE INVENTION

The invention relates generally to networked computer devices, and more specifically, to geographically distributed smart address signs sensing physical deliveries fulfilling orders associated with the address over a data communication system.

BACKGROUND

On demand location delivery is becoming an increasing important service for products. Pizza has been a long-time on demand delivered good. In addition, consumers have shifted to Amazon and other distributors for home delivery of goods that were typically picked up from vendors and are now promised for next day and even next hour deliveries. Furthermore, new automated forms of delivery on the horizon, such as flying drones and other devices, will bring the scope of delivered goods to an all-time high.

Problematically, these changes exacerbate the lack of visibility during the delivery process is problematic for both distributors of goods and consumers of goods. Distributors experience tremendous losses during the process of shipping, and particularly, at final delivery destinations.

Furthermore, delivery confirmations are one-sided, being based on self-serving information provided by vendors. Sometimes, deliverers make false claims about delivery times to cover for running late. Other times, consumers may make false claims about not receiving deliveries. Additionally, consumers are often unaware of when deliveries are made as goods are often left on porch without ringing the doorbell.

Therefore, what is needed is a robust technique for geographically distributed smart address signs for sensing physical deliveries fulfilling orders associated with the address over a data communication system.

SUMMARY

These shortcomings are addressed by the present disclosure of methods, computer program products, and systems for geographically distributed smart address signs for sensing physical deliveries fulfilling orders associated with the address over a data communication system.

In one embodiment, an address sign registration module receives and stores geo-locations and unique identifiers from a plurality of smart address signs wirelessly connected to the data communication network. Each address sign displays a physical address associated with a geo-location and comprises wireless transceiver.

In another embodiment, an order tracking module receives orders for delivery from online purchase systems to customers associated with the plurality of smart address signs. An artificial intelligence module maintains real-time delivery information for the orders. The order tracking module receives messages from the smart address signs upon arrival of orders associated with the geo-locations and, in response, sends messages to online purchase systems and notifications to the customer confirming delivery.

Advantageously, real-time delivery confirmation is independently confirmed.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 6 is a block diagram illustrating computing environment for implementing components of the system, according to an embodiment.

DETAILED DESCRIPTION

The description below provides methods, computer program products, and systems for geographically distributed smart address signs for sensing physical deliveries fulfilling orders associated with the address over a data communication system.

One of ordinary skill in the art will recognize many additional variations made possible by the succinct description of techniques below. For example, the limited examples referred to throughout merely for the sake of clarity and conciseness, although many other specific implementations can be substituted under the techniques described herein.

I. Systems for Geographically Distributed Smart Address Signs (FIG. 1-4)

Figure 1:
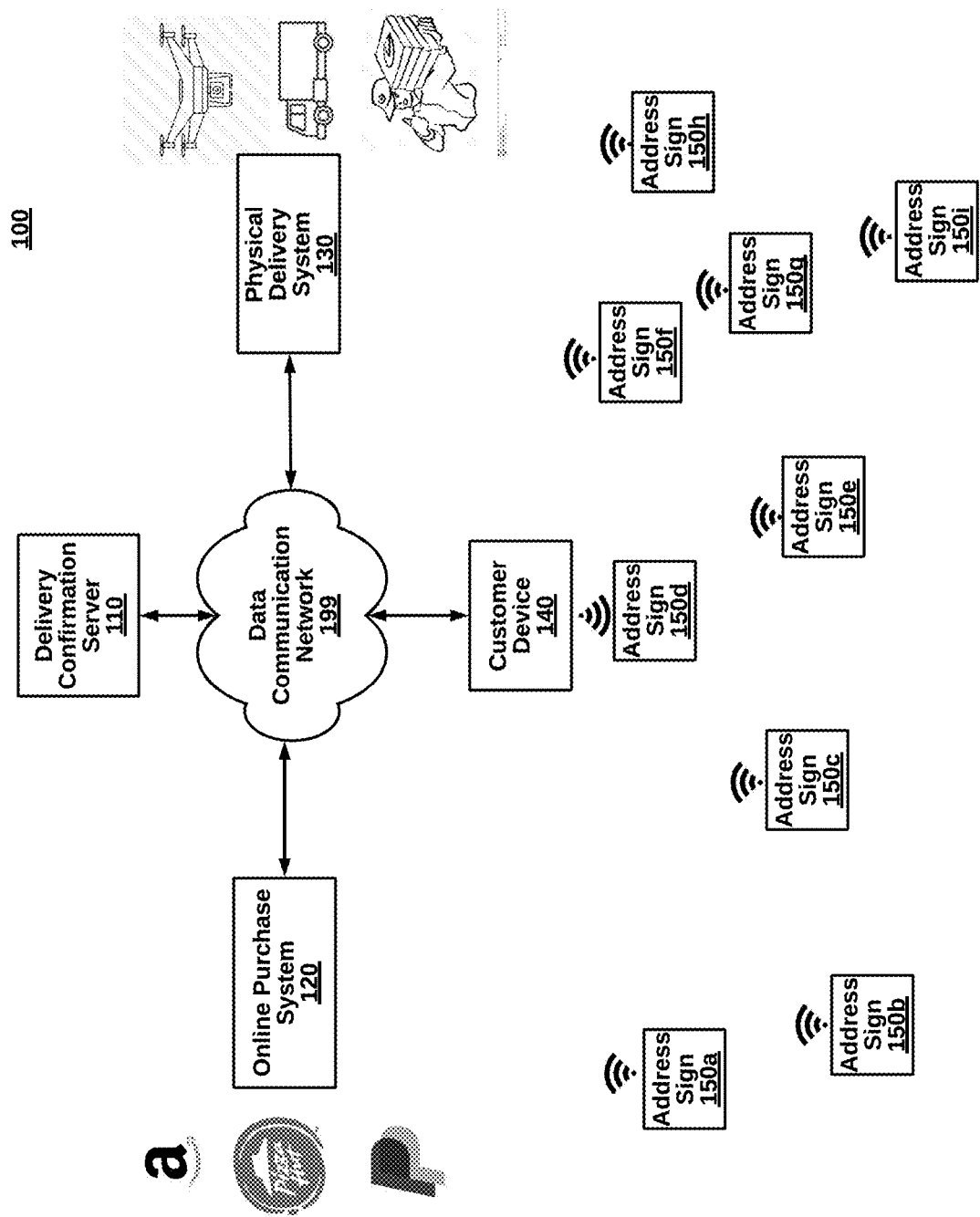
FIG. 1 is a high-level block diagrams illustrating a system for geographically distributed smart address signs for sensing physical deliveries fulfilling orders associated with the address over a data communication system, according to an embodiment.

FIG. 1 is a high-level block diagram illustrating a system 100 for geographically distributed smart address signs for sensing physical deliveries fulfilling orders associated with the address over a data communication system, according to one embodiment. The system 100 includes a delivery confirmation server 110, an online purchase system 120, a physical delivery system 130, a customer device 140 and address signs 150a-i. Other variations are possible. For example, there can be just one address sign or millions of the same.

Each of the components of the system 100 is communicatively coupled through the data communication network 199, either directly or indirectly. Preferably, the delivery confirmation server 110, the online purchase party system 120, and the physical delivery system 130 have high quality network connections that are wired and highly availability. Customer device 140 can connect through a home Internet service, Wi-Fi or cell connection (e.g., 3G, 4G or 5G), for example. Address signs 150a-i may be wirelessly connected through Wi-Fi or Bluetooth for easy connections and in power-saving mode, leading to intermittent and less reliable connections, in some implementations. Essentially, the data communications network 199 provides a channel connecting all of the components over which messaging for specific orders takes place. For instance, messages can travel from the delivery confirmation server 110 over the Internet, transfer to a cellular network, and then to a local area network set up at a customer's home, finally ending up as a message displayed to the customer on the customer device 140 in the form of a smart television. Communication protocols and application layer APIs include headers for routing messages between components and data for message content about specific orders.

The address signs 150a-i can collectively form a sensor network providing information feedback for the delivery confirmation server 110. Besides the benefit to individual customers, the aggregate power of information received from each address signs assists artificial intelligence and predictive modeling. Examples of data feedback include weather, traffic, delivery driver identification, delivery truck identification, customer identification, early or late delivery, theft alerts, fraud alerts, images, video and other custom data.

Figure 2B:
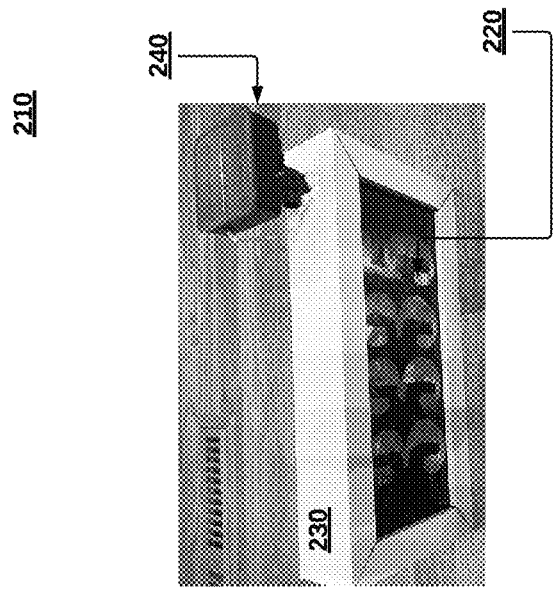
FIGS. 2A and 2B are perspective diagrams of an address sign and a receiving pad, according to an embodiment.
Figure 2A:
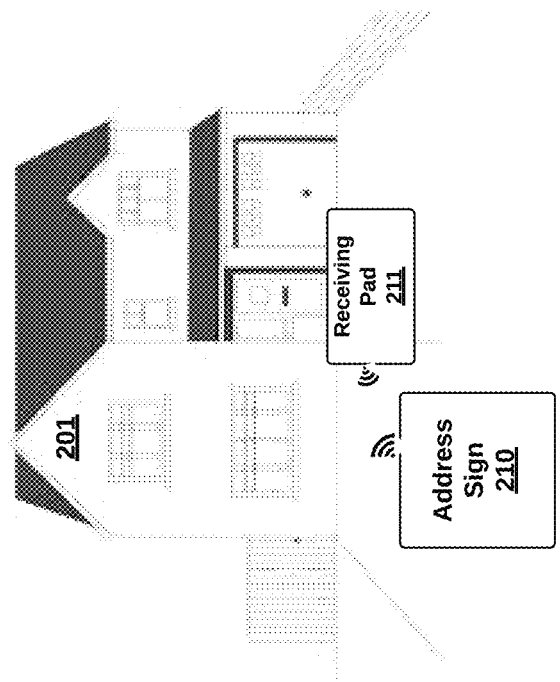

One example address sign 210 is shown in situ at a customer home 201 is shown in FIG. 2A with additional details illustrated in FIG. 2B. The address sign 210 can be permanently mounted to a mailbox, a front porch, or in the front yard of the customer home 201. In one example, address signs are placed such that wireless coverage overlaps a driveway where delivery vehicles park or a sidewalk leading to a doorway. Once an object breaches the area, a processor wakes up and attempts to read any packages for identification information, such as an RFID tag. In a different example, the delivery truck initiates communication with the address sign 210 to wake it up. In other embodiments, the address sign 210 can be placed at a business, a post office box, an Amazon locker, or even a temporary, popup location such as when placed on a table at a Starbucks lounge. In one case, an Uber driver attaches the address sign 210 to a vehicle with dynamic locations.

The address sign 210 includes a display 220 to show house number "3335". The display can correspond to the postmaster address, or other delineations such as room number or map coordinates. A housing 230 is preferably weatherproof and made of a durable aluminum or plastic to last for years and protect internal electronics. An LED backlight illuminates the address display for visibility at night or during rain falls, for instance. When a delivery is expected, the backlight can be changed to red or start blinking for even easier identification by persons or drones with computer vision.

A wireless transceiver 240 senses deliveries as input and plugs an individual sign into the sensor network for output. In an embodiment, a processor senses that a delivery device or delivery person is within range and sends a message to the delivery confirmation server 110 through the wireless transceiver 240. In more detail, the wireless transceiver can connect to Wi-Fi, Bluetooth, cellular networks, or the like, to send an identification of the delivery device and/or an identification of the delivered good. Network set up can be aided by a downloadable app on a smartphone or computer browser connected to the home network. The wireless transceiver 240 (and processor) can be OEM or an older sign can be retrofit with an add on component. Computer components of one implementation are powered with a built-in solar panel.

An optional embodiment includes a receiving pad 211 for confirmation of an expected weight of the package and for sensing a physical presence until removed by the customer. A verification process identifies removal by the customer through a smart phone app, or other mechanism. The address sign 210 can connect by mesh network or hot spot to the receiving pad 211 for monitoring, or vice versa. The receiving pad 211 can also be independently connected to the delivery confirmation server 110. A camera on the receiving pad 211 or the address sign 210 with computer vision can augment delivery confirmation. An embodiment of the pad includes an automatic lock that opens upon delivery and locks until a verified customer arrives for retrieval (e.g., similar to Amazon locker), and then sends out a notification. In another embodiment, the receiving pad operates independently of the smart address sign 210.

One embodiment of the address sign includes source code for artificial intelligence. Patterns for purchasing and patterns for delivery are learned over time, in coordination with online processes of the delivery confirmation server 110. The historical data provides input for generating a prediction model that anticipates delivery activity.

The delivery confirmation server 110 communicates with online purchase systems, delivery systems, and a network of address signs as sensors for real-time monitoring of goods from end-to-end. An app downloaded for registration can also maintain application layer connections between address signs and the central server. When orders are received from customers from any of several different third parties, the delivery confirmation server 110 can transparently integrate within different outside processes to manage tracking and reporting the customer, in some embodiments. In other embodiments, the delivery confirmation server 110 acts conspicuously as an outside process with independent reporting directly to customers. For example, customers can have accounts directly with the delivery confirmation server 110 and initiate tracking of orders from different vendors under a common platform. In yet other embodiments, the delivery confirmation server 110 is part of, and operated by, the online purchase system 120 for its exclusive use. Artificial intelligence processes can predict arrival of goods, and anticipate delivery changes, based on related, current activity in the sensor network and historical data. Ultimately, delivery confirmation signals are received in real-time from address signs upon sensing arrival of goods at designated locations. In response, notifications are sent to customers through predesignated channels, such as smart watches or smart Internet appliances. Artificial intelligence can also identify fraud from delivery personnel and customers. In one case, delivery security requirements are updated in real-time based on activity nearby a delivery location.

The delivery confirmation server 110 can be a server blade, a virtual server, a centralized computer, or a distributed computer system. More detailed embodiments of the delivery confirmation server 110 and internal operations are set forth below with respect to FIG. 3.

The online purchase system 120 (e.g., Amazon, Pizza Hut or PayPal), in an embodiment, outsources delivery confirmation to the delivery confirmation server 110. To do so, a customer logs on to the online purchase system 120 to purchase goods and then order information is passed to the delivery confirmation server 110 in the checkout process similar to integrated payment processes (e.g., PayPal). Back end APIs define a message format for automatically passing information between systems such as good description, order number, delivery route, delivery service, guaranteed delivery date and time, delivery instructions, customer identification, and the like. Periodically, tracking information can be received back from the delivery confirmation server 110 so that status updates can be provided to the customer. In one implementation, the customer can be PayPal using delivery confirmation and dispute resolution for its own internal processes of ensuring delivery from vendors. In a different implementation, the customer can be UPS as an independent doublecheck of the integrity of its own internal tracking systems. Additional implementation details are discussed below in association with FIG. 4.

The physical delivery system 130 (e.g., drone robot, UPS, or pizza delivery) physically transports goods from distributor to customer. An order can be traverse more than one delivery mode, such as from train freight to shipping cargo to trucking freight. A pizza store receiving a customer order can dispatch via flying drone or driverless car for a fully automated delivery. Vendors such as Door Dash food delivery could overlap both the physical delivery system 130 and the online purchase system 120. In one embodiment, tracking and other information is extracted from the physical delivery system 130, such as self-reported online ETA or FedEx package number.

The customer device 140 is a terminal for customers to shop and purchase goods, and also to track delivery. Numerous physical implementations are possible, such as personal computers, laptops, tablets, smart phones, smart watches, Internet appliances, and the like.

Figures 3, 4:
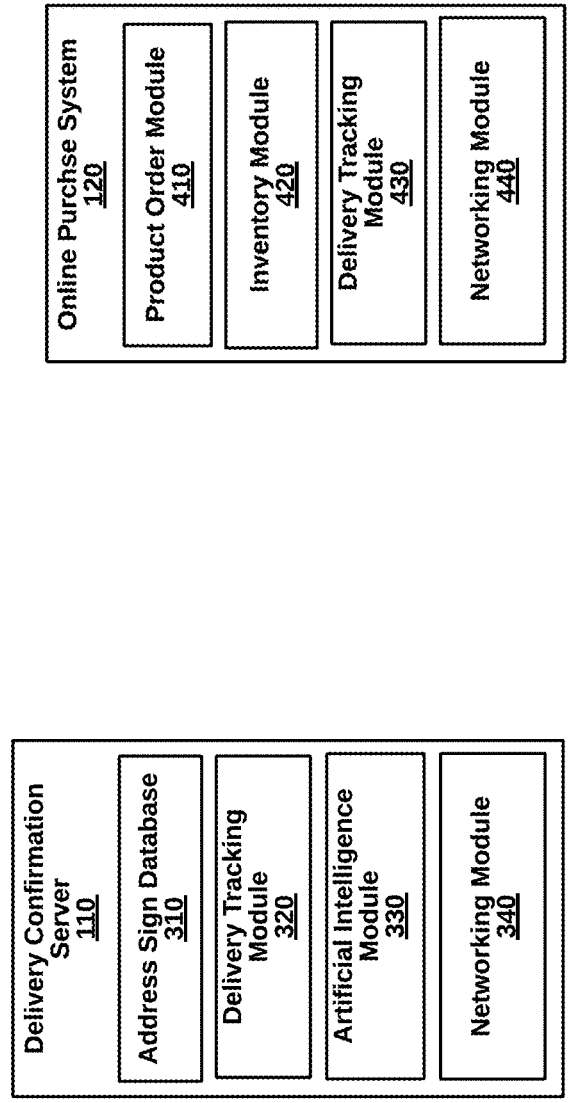
FIG. 3 is a block diagram illustrating a more detailed view of the delivery confirmation server of the system, according to an embodiment.
FIG. 4 is a block diagram illustrating a more detailed view of the online purchase system of the system, according to an embodiment.

FIG. 3 is a block diagram illustrating a more detailed view of the delivery confirmation server 110 of the system 100, according to an embodiment. The delivery confirmation server 110 comprises an address sign database 310, a delivery tracking module 320, an artificial intelligence module 330, and a networking module 340. The components can be implemented in hardware, software, or a combination of both.

Individual customers can register with the address sign database 310 directly. Another implementation indirectly registers customers through outsourced orders from the online purchase system 120. Each record stored in table or other format has a name, address, delivery preferences, notification preferences, authentication, and payment information, for instance. The delivery tracking module 320 tracks individual orders associated with customer records. Integrations with outside systems, such as Fed Ex or UPS can import or extract data reported by those deliverers. The artificial intelligence module 330 makes use of neural networks and predictive modeling to predict deliveries for customers, and identify fraud and theft for the vendors, along with other functions. Many different inputs improve accuracy, such as historical delivery information (internal and imported from other delivery systems), real-time information concerning related deliveries, traffic information, route information, time of day, weather, news feeds, customer updates, driver updates, and other appropriate automatic data feeds. The networking module 340 maintains connections to the data communication network channel and other components connected thereto.

FIG. 4 is a block diagram illustrating a more detailed view of the online purchase system 120 of the system 100, according to an embodiment. The online purchase system 120 includes a product order module 310, an inventory module 320, a delivery tracking module 330, and a networking module 340. The components can be implemented in hardware, software, or a combination of both.

The product order module 410 can be a digital storefront with a shopping cart that initiates shipping to customers purchasing goods. The inventory module 420 can link physical goods that are available for fulfilling orders, and determine which warehouse location or food store location, for example, is best suited to fulfill. The delivery tracking module 430 reports to customers and vendors about status of deliveries and confirms deliveries based on interaction with the delivery confirmation server 110 and the physical delivery system 130.

II. Methods for Geographically Distributed Smart Address Signs (FIG. 5)

Figure 5:
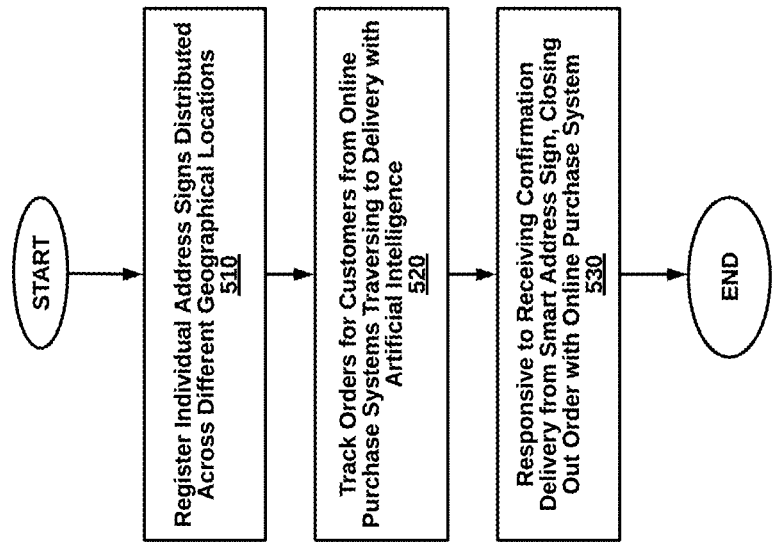
FIG. 5 is a high-level flow diagram illustrating a method for geographically distributed smart address signs for sensing physical deliveries fulfilling orders associated with the address over a data communication system, according to one preferred embodiment.

FIG. 5 is a high-level flow diagram illustrating a method for providing compiler support with a compiler plugin optimized for dual support of design verification and resource packaging, according to one embodiment. The method 500 can be implemented, for example, by the system 100 of FIG. 1. The steps are merely representative groupings of functionality, as there can be more or fewer steps, and the steps can be performed in different orders. Many other variations of the method 500 are possible.

At step 510, individual address signs distributed across different geographical locations are registered. At step 520, orders received from different online purchase systems traversing to delivery are tracked through physical delivery systems, in some embodiments, using artificial intelligence. At step 530, a specific order is closed out with the online purchase system responsive to receiving confirmation of delivery from an associated address sign.

III. Generic Computing Device (FIG. 6)

FIG. 6 is a block diagram illustrating an example computing device 600 for use in the system 100 of FIG. 1, according to one embodiment. The computing device 600 is implementable for each of the components of the system 100. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog, and use any suitable protocol.

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6, Windows 8 or Windows 10), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 620 can be a network processor (e.g., optimized for IEEE 802.11, IEEE 802.11AC or IEEE 802.11AX), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A delivery confirmation server communicatively coupled over a data communication network to a plurality of geographically distributed smart address signs for sensing physical deliveries fulfilling orders associated with the address over a data communication system, the comprising:
   a processor of the delivery confirmation server;
   a network interface, coupled to the data communication network and to the processor; and
   a memory, coupled to the processor, comprising:
      an address sign registration module, through the network interface coupled to the data communication network, to register customers and store geo-locations and unique identifiers from a plurality of smart address signs associated with the registered customers, wherein each address sign displays a physical address associated with a geo-location and comprises a communication unit communicatively coupled to the data communication network;
      an order tracking module to, via the network interface, receive orders for delivery from a plurality of online purchase systems for registered customers associated with the plurality of smart address signs, wherein a specific order is received for a specific registered customer; and
      an artificial intelligence module, via the processor, to use neural networks in forecasting real-time delivery information to the specific registered customer for the specific order based on historical delivery information and real-time information received from the plurality of smart address signs concerning different orders for different customers,
      wherein the order tracking module receives a message from a smart address sign upon arrival of the specific order associated with a geo-location and, in response, sends a message to the specific registered customer confirming delivery.

2. The delivery confirmation server of claim 1, wherein the address sign registration module tracks dynamic locations of address signs.

3. The delivery confirmation server of claim 1, wherein the address sign registration module tracks temporary static locations of address signs.

4. The delivery confirmation server of claim 1, wherein the delivery confirmation server and the online purchase system are operated by a single entity.

5. The delivery confirmation server of claim 1, further comprising:
   receiving a message from a receiving pad that physically detects a presence of the order based on an expected weight.

6. The delivery confirmation server of claim 1, wherein the order tracking module receives updates from an external delivery tracking system.

7. The delivery confirmation server of claim 1, wherein the received message from the receiving pad also confirms that a verified customer has retrieved the order.

8. The delivery confirmation server of claim 1, wherein the smart address sign is registered with the address sign registration module from an application executing on a smart phone associated with the customer.

9. A computer-implemented method in a delivery confirmation server communicatively coupled over a data communication network to a plurality of geographically distributed smart address signs for sensing physical deliveries fulfilling orders associated with the address over a data communication system, the method comprising:

registering customers, through a network interface coupled to the data communication network, and storing geo-locations and unique identifiers from a plurality of smart address signs associated with the registered customers, wherein each address sign displays a physical address associated with a geo-location and comprises a communication unit communicatively coupled to the data communication network;

receiving orders for delivery from a plurality of online purchase systems for registered customers associated with the plurality of smart address signs, wherein a specific order is received for a specific registered customer; and forecasting, using neural networks, real-time delivery information to the specific registered customer for the specific order based on historical delivery information and real-time information received from the plurality of smart address signs concerning different orders for different customers, wherein the order tracking module receives a message from a smart address sign upon arrival of the specific order associated with a geo-location and, in response, sends a message to the specific registered customer confirming delivery.

10. A non-transitory computer-readable media storing source code that, when executed by a processor, performs a method in a delivery confirmation server communicatively coupled over a data communication network to a plurality of geographically distributed smart address signs for sensing physical deliveries fulfilling orders associated with the address over a data communication system, the method comprising:

registering customers, through a network interface coupled to the data communication network, and storing geo-locations and unique identifiers from a plurality of smart address signs associated with the registered customers, wherein each address sign displays a physical address associated with a geo-location and comprises a communication unit communicatively coupled to the data communication network;

receiving orders for delivery from a plurality of online purchase systems for registered customers associated with the plurality of smart address signs, wherein a specific order is received for a specific registered customer; and forecasting, using neural networks, real-time delivery information to the specific registered customer for the specific order based on historical delivery information and real-time information received from the plurality of smart address signs concerning different orders for different customers, wherein the order tracking module receives a message from a smart address sign upon arrival of the specific order associated with a geo-location and, in response, sends a message to the specific registered customer confirming delivery.

\* \* \* \* \*